United States Patent
Roth

(10) Patent No.: US 9,170,648 B2
(45) Date of Patent: Oct. 27, 2015

(54) SYSTEM AND METHOD FOR VIRTUAL ENGINEERING

(75) Inventor: Andrew S. Roth, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 393 days.

(21) Appl. No.: 13/438,692

(22) Filed: Apr. 3, 2012

(65) Prior Publication Data

US 2013/0257904 A1 Oct. 3, 2013

(51) Int. Cl.
| | |
|---|---|
| *G06T 19/00* | (2011.01) |
| *G06F 3/01* | (2006.01) |
| *G06F 3/03* | (2006.01) |
| *G06F 3/038* | (2013.01) |
| *G02B 27/01* | (2006.01) |
| *G06F 3/0346* | (2013.01) |

(52) U.S. Cl.
CPC .............. *G06F 3/014* (2013.01); *G02B 27/017* (2013.01); *G06F 3/012* (2013.01); *G06F 3/0304* (2013.01); *G06F 3/038* (2013.01); *G06F 3/0346* (2013.01); *G02B 2027/0187* (2013.01); *G06F 2203/0382* (2013.01); *G06F 2203/0384* (2013.01)

(58) Field of Classification Search
CPC ......... G06T 19/006; G06T 19/00; G09G 5/00
USPC .................. 345/163, 157, 629, 633
See application file for complete search history.

(56) References Cited

U.S. PATENT DOCUMENTS

| | | | |
|---|---|---|---|
| 5,320,538 A | 6/1994 | Baum | |
| 5,381,158 A | 1/1995 | Takahara et al. | |
| 5,436,638 A * | 7/1995 | Bolas et al. | 345/156 |
| 5,495,576 A * | 2/1996 | Ritchey | 345/420 |
| 5,980,256 A * | 11/1999 | Carmein | 434/55 |
| 6,084,556 A * | 7/2000 | Zwern | 345/8 |
| 6,127,990 A * | 10/2000 | Zwern | 345/8 |
| 6,184,847 B1 * | 2/2001 | Fateh et al. | 345/8 |
| 6,771,294 B1 | 8/2004 | Pulli et al. | |
| 7,190,331 B2 * | 3/2007 | Genc et al. | 345/9 |
| 8,456,416 B2 * | 6/2013 | Izumi | 345/156 |

(Continued)

FOREIGN PATENT DOCUMENTS

| | | |
|---|---|---|
| WO | WO9906981 A1 | 2/1999 |
| WO | WO2008091857 A1 | 7/2008 |
| WO | WO2010088032 A2 | 8/2010 |

OTHER PUBLICATIONS

Scheibe et al. "Tactile Feedback at the Finger Tips for Improved Direct Interaction in Immersive Environments", IEEE 2007.*

(Continued)

*Primary Examiner* — Kimbinh T Nguyen
(74) *Attorney, Agent, or Firm* — Yee & Associates, P.C.

(57) ABSTRACT

A method and system for generating a virtual image of a virtual environment is provided. A virtual reality manager receives hand position data for at least one hand of a user from a hand system. The virtual reality manager receives head position data for a head of the user from a head-mounted system. The virtual reality manager identifies image-based position data and a current frame of reference for a current time using a target image corresponding to the current time. The virtual reality manager generates virtual image control data for the current time using the hand position data, the head position data, the image-based position data, and the current frame of reference. The virtual image control data is configured for use by a virtual image application.

21 Claims, 8 Drawing Sheets

(56) References Cited

U.S. PATENT DOCUMENTS

| | | | |
|---|---|---|---|
| 8,615,383 B2* | 12/2013 | Dobbins et al. | 703/1 |
| 2011/0225591 A1 | 9/2011 | Wada et al. | |
| 2012/0249591 A1* | 10/2012 | Maciocci et al. | 345/633 |
| 2012/0249741 A1* | 10/2012 | Maciocci et al. | 348/46 |
| 2013/0117377 A1* | 5/2013 | Miller | 709/205 |

OTHER PUBLICATIONS

Buchmann et al. "Interaction with Partially Transparent Hands and Objects". ACM 2005.*

Chan et al., "Hand Motion Prediction for Distributed Virtual Environments", IEEE Transactions on Visualization and Computer Graphics, vol. 4 No. 1, Jan. 2008, 14 pages.

Fox, "Synchronization of input and output measurements using a Kalman filter", MIC '06 Proceedings of the 25th IASTED international conference on Modeling, indentification, and control, Copyright 2006, 6 pages.

Zhu et al., "Robust Kalman Filter Design for Discrete Time-Delay Systems", Circuits Systems Signal Processing, vol. 21 No. 3, Copyright 2002, pp. 319-335.

Welch et al., "An Introduction to the Kalman Filter", SIGGRAPH 2001, Course 8,University of North Carolina at Chapel Hill, ACM, Inc., Copyright 2001, accessed Feb. 17, 2012, 81 pages, http://www.cs.unc.edu/~tracker/rnedia/pdf/SIGGRAPH2001_CoursePack_08.pdf.

Rimminen et al., "Positioning Accuracy and Multi-Target Separation with a Human Tracking System Using Near Field Imaging", International Journal on Smart Sensing and Intelligent Systems, vol. 2 No. 1, Mar. 2009, 20 pages.

Kato et al., "Articulated Hand Tracking by ICA-based Hand Model and Multiple Cameras", Scene Reconstruction, Pose Estimation and Tracking, Jun. 2007, pp. 489-512.

Erkan, "Model Based Three Dimensional Hand Posture Recognition for Hand Tracking", Master's Thesis, Boğaziçi University, Jul. 2004, 75 pages.

Brodie et al., "Fusion motion capture: a prototype system using inertial measurement units and GPS for the biomechanical analysis of ski racing", Sports Technology, vol. 1 No. 1, Copyright 2008, pp. 17-28.

Erol et al., "A Review on Vision-Based Full DOF Hand Motion Estimation", IEEE Computer Society Conference on Computer Vision and Pattern Recognition, Jun. 2005, 8 pages.

Zhu, "Color-Based Fingertip Tracking Using Modified Dynamic Model Particle Filtering Method", Master's Thesis, Ohio State University, Electrical and Computer Engineering, Copyright 2011, 70 pages.

Stenger et al., "Model-Based Hand Tracking Using an Unscented Kalman Filter", Proceedings of the British Machine Vision Conference, vol. 1, Sep. 2001, pp. 63-72.

Aristidou et al., "Motion Capture with Constrained Inverse Kinematics for Real-Time Hand Tracking", 2010 4th International Symposium on Communications, Control, and Signal Processing, Mar. 2010, 5 pages.

Causo et al., "Predictive Tracking in Vision-based Hand Pose Estimation using Unscented Kalman Filter and Multi-viewpoint Cameras", Human-Robot Interaction, Feb. 2010, pp. 155-170, accessed Feb. 20, 2012, http://www.intechopen.com/source/pdfs/8627/InTech-Predictive_tracking_in_vision_based_hand_pose_estimation_using_unscented_kalman_filter_and_multi_viewpoint_cameras.pdf.

Stenger, "Model-Based Hand Tracking Using A Hierarchical Bayesian Filter", PhD Thesis, University of Cambridge, Mar. 2004, 125 pages.

Ulhaas, "Robust Optical User Motion Tracking Using a Kalman Filter", Technical Report of Augsburg University, Copyright 2003, 10 pages.

Rose et al., "Reducing Particle Filtering Complexity for 3D Motion Capture using Dynamic Bayesian Networks", Proceedings of the Twenty-Third AAAI Conference on Artificial Intelligence, Jul. 2008, 6 pages.

Mörwald et al., "Predicting the Unobservable: Visual 3D Tracking with a Probabilistic Motion Model", 2011 IEEE International Conference on Robotics and Automation, May 2011, pp. 1849-1855.

Digaňa et al., "Kalman Filtering in Multi-sensor Fusion", Master's Thesis, Helsinki University of Technology, Sep. 2004, 138 pages.

Bray et al., "Smart Particle Filtering for High-Dimensional Tracking", Computer Vision and Image Understanding, vol. 106 No. 1, Publisher Elsevier Science Inc., copyright 2007, 25 pages.

"Transducer Electronic Data Sheet (TEDS) specification", 1451.3-2003 IEEE Standard for a Smart Transducer Interface for Sensors and Actuators—Digital Communication & TEDS Formats for Distributed Multidrop Systems, copyright 2004, pp. 53-97.

"Real-time Operating System", Wikipedia, accessed Feb. 17, 2012, 6 pages, http://en.wikipedia.org/wiki/Real-time_operating_system.

"LynxOS", Wikipedia, accessed Feb. 17, 2012, 2 pages, http://en.wikipedia.org/wiki/LynxOS.

"VxWorks", Wikipedia, accessed Feb. 17, 2012, 6 pages, http://en.wikipedia.org/wiki/VxWorks.

Fu et al., "Tracking whole hand kinematics using extended Kalman filter", 2010 Annual International Conference of the IEEE Engineering in Medicine and Biology Society (EMBC), Aug. 2010, pp. 4606-4609.

Extended European Search Report dated Feb. 18, 2015, regarding Appplication No. EP13161235.0, 8 pages.

* cited by examiner

SYSTEM AND METHOD FOR VIRTUAL ENGINEERING

BACKGROUND INFORMATION

1. Field

The present disclosure relates generally to virtual reality and, in particular, to user interaction with a virtual environment. Still more particularly, the present disclosure relates to a method and system for increasing a level of eye-hand coordination when a user interacts with a virtual environment.

2. Background

Virtual reality (VR) is a technology that may be used to simulate a real environment or an imaginary environment in the form of a virtual environment. A virtual environment is a computer-simulated environment that can simulate physical presence in a real environment or an imaginary environment. Typically, a virtual environment is visually presented to a user as a two-dimensional environment or a three-dimensional environment. In some cases, sensory information, such as sound, may be presented to the user in addition to the visual presentation of the virtual environment.

Different types of virtual reality systems may provide different levels of immersion for a user. As used herein, the level of "immersion" provided by a virtual reality system is the extent to which a user feels present in the virtual environment created by the virtual reality system. A user may be fully immersed in a virtual environment when the user experiences both perceptive immersion and cognitive immersion.

A user may experience perceptive immersion when the user has a sense of being physically present in the virtual environment. For example, the user may feel that his or her hands are present in the virtual environment. A user may experience cognitive immersion when the user has a sense that what is happening in the virtual environment is actually happening. In other words, the mind of the user may be immersed in the virtual environment.

Further, when a user is cognitively immersed in a virtual environment, the actions of the user may have effects on the virtual environment, and events in the virtual environment may affect the senses of the user. When the user is cognitively immersed in the virtual environment, the user may accept the effects on the virtual environment and the effects on the senses of the user as actually occurring.

Some currently available virtual reality systems may be unable to provide a desired level of immersion. For example, some currently available virtual reality systems may be unable to simulate human mobility within a virtual environment with a desired level of accuracy. In particular, these virtual reality systems may be unable to simulate rotation of human skeletal components about hinged joints with a desired level of accuracy without increasing the size and/or weight of the virtual reality systems more than desired.

For example, a gyroscope may be capable of measuring the rotation of a human skeletal component about a hinged joint. However, the configuration for the gyroscope needed to measure this type of rotation may be larger and/or heavier than desired. Further, this configuration for the gyroscope may exert undesired forces on the human body part to which the gyroscope is attached. For example, a gyroscope attached to a hand may exert undesired forces on the hand when measuring movement of the hand. These undesired forces may cause the hand to move in an undesired manner.

Some currently available virtual reality systems may use displacement estimation techniques to track the movement of, for example, the fingers of a user. However, these displacement estimation techniques may track the movement of the fingers of the user with a less than desired accuracy.

In this manner, some of the currently available virtual reality systems may be unable to simulate the movement of the human body and/or parts of the human body with a desired level of accuracy. Consequently, these currently available virtual reality systems may be unable to provide a user with the level of eye-hand coordination needed to allow the user to feel a desired level of immersion within the virtual environment.

Without the level of eye-hand coordination needed for providing the desired level of immersion within the virtual environment, a user may be unable to perform certain tasks within the virtual environment as quickly and/or efficiently as desired. Therefore, it would be desirable to have a system and method that takes into account at least some of the issues discussed above, as well as other possible issues.

SUMMARY

In one illustrative embodiment, a method for generating a virtual image of a virtual environment is provided. A virtual reality manager receives hand position data for at least one hand of a user from a hand system. The virtual reality manager receives head position data for the head of the user from a head-mounted system. The virtual reality manager identifies image-based position data and a current frame of reference for a current time using a target image corresponding to the current time. The virtual reality manager generates virtual image control data for the current time using the hand position data, the head position data, the image-based position data, and the current frame of reference. The virtual image control data is configured for use by a virtual image application.

In another illustrative embodiment, a virtual reality system comprises a head-mounted system and a virtual reality manager. The head-mounted system is configured to be worn relative to the head of a user. The virtual reality manager is associated with the head-mounted system. The virtual reality manager is configured to receive hand position data for at least one hand of the user from a hand system. The virtual reality manager is configured to receive head position data for the head of the user from a sensor system in the head-mounted system. The virtual reality manager is configured to identify image-based position data and a current frame of reference for a current time using a target image corresponding to the current time. The virtual reality manager is configured to generate virtual image control data for the current time using the hand position data, the head position data, the image-based position data, and the current frame of reference. The virtual image control data is configured for use by a virtual image application.

In yet another illustrative embodiment, a computer comprises a bus, a non-transitory storage device connected to the bus, and a processor unit connected to the bus. The non-transitory storage device includes program code. The processor unit is configured to execute the program code to receive hand position data for at least one hand of a user from a hand system, receive head position data for the head of the user from a head-mounted system, identify image-based position data and a current frame of reference for a current time using a target image corresponding to the current time, and generate virtual image control data for the current time using the hand position data, the head position data, the image-based position data, and the current frame of reference. The virtual image control data is configured for use by a virtual image application.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of an illustrative embodiment of the present disclosure when read in conjunction with the accompanying drawings, wherein:

DETAILED DESCRIPTION

Figure 1:
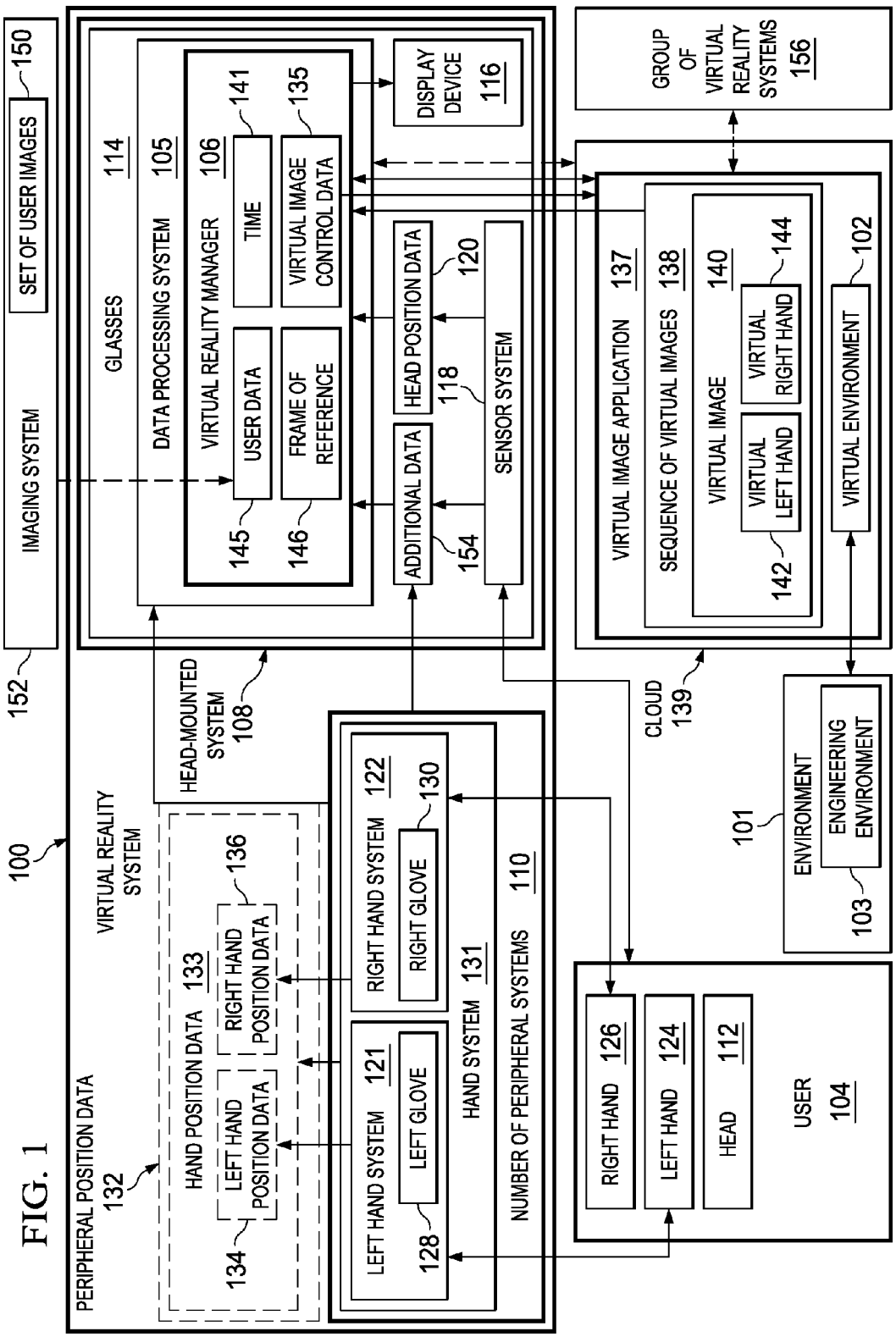
FIG. 1 is an illustration of a virtual reality system in the form of a block diagram in accordance with an illustrative embodiment.

The different illustrative embodiments recognize and take into account different considerations. For example, the different illustrative embodiments recognize and take into account that a virtual environment may be useful for performing different types of engineering tasks.

These engineering tasks may include, for example, without limitation, designing a vehicle, managing data for a product design, testing a structure for use in an aircraft, testing the operation of a configuration for an antenna system, inspecting a system, performing maintenance on a structure, controlling operations of a vehicle, controlling manufacturing equipment in a manufacturing facility, controlling a structure in outer space, and other suitable types of engineering tasks. Other types of engineering tasks may include, for example, without limitation, interacting with a computer program, operating an electromechanical device located in an inaccessible environment, operating a mobile platform under extreme weather conditions and/or temperature conditions, and still other suitable types of engineering tasks.

As one illustrative example, a virtual environment that simulates a testing environment having selected testing conditions may be used for testing the operation of a particular configuration for a component for a vehicle under those selected conditions. In this illustrative example, a model of the particular configuration for the component is introduced into the virtual environment.

Testing the operation of the particular configuration for the component using the model in the virtual environment may be less expensive, less time-consuming, and/or more efficient than testing the real component in a real testing environment. Further, this type of virtual testing of the component may require fewer resources and/or personnel as compared to physical testing of the component.

However, the different illustrative embodiments recognize and take into account that a user may be unable to use the virtual environment created by a virtual reality system to perform certain types of engineering tasks if the virtual reality system does not provide a desired level of eye-hand coordination. As used herein, "eye-hand coordination" is the coordinated control of eye movement and hand movement. Eye-hand coordination is the use of visual input to guide movement of the hands and the use of proprioception of the hands to guide movement of the eyes.

Certain types of engineering tasks may require a higher level of eye-hand coordination than other types of engineering tasks. As one illustrative example, operating a virtual aircraft comprising different types of controls, switches, buttons, and user interfaces may require a higher level of eye-hand coordination than pushing a door open in a virtual environment.

The different illustrative embodiments recognize and take into account that providing a desired level of eye-hand coordination may require identifying the positions of the hands of the user and the head of the user with respect to a frame of reference for the virtual environment with a desired level of accuracy. Additionally, the different illustrative embodiments recognize and take into account that providing the desired level of eye-hand coordination may require simulating the movement of the hands and fingers of the user within the virtual environment with a desired level of accuracy in substantially real-time. As used herein, "in substantially real-time" means without time delays perceivable to the user.

Thus, the different illustrative embodiments provide a method and system for increasing a level of eye-hand coordination for a user when the user interacts with a virtual environment. In particular, the different illustrative embodiments provide a virtual reality system configured to coordinate hand position data and head position data for the user and synchronize this data with respect to time to provide the user with a desired level of eye-hand coordination within a virtual environment.

With reference now to FIG. 1, an illustration of a virtual reality system in the form of a block diagram is depicted in accordance with an illustrative embodiment. In these illustrative examples, virtual reality system 100 is configured to visually present virtual environment 102 to user 104. Further, user 104 may interact with virtual environment 102 using virtual reality system 100.

In these illustrative examples, virtual environment 102 is a simulation of environment 101. Environment 101 may be a real environment or an imaginary environment. For example, environment 101 may be a physical environment or an abstract environment.

In one illustrative example, environment 101 takes the form of engineering environment 103. Engineering environment 103 may be selected from one of, for example, without limitation, a design environment, a manufacturing environment, a computer environment, a testing environment, a data management environment, an inspection environment, an operations environment, or some other suitable type of engineering environment.

When virtual environment 102 is a simulation of engineering environment 103, user 104 may use virtual reality system 100 to interact with virtual environment 102 to perform one or more engineering tasks. For example, user 104 may use virtual reality system 100 to design an object, such as an aircraft or a part for an aircraft, within virtual environment 102.

In another illustrative example, user 104 may use virtual reality system 100 to perform tasks related to air traffic control. For example, virtual environment 102 may be a simulation of a region of airspace. User 104 may use virtual reality system 100 to control operation of and/or exchange information with an aircraft in this region of airspace using a model of the aircraft in virtual environment 102.

Further, in yet another illustrative example, virtual environment 102 may be a simulation of a user interface for a computer program. User 104 may use virtual reality system 100 to interact with the virtual user interface to interact with the computer program. For example, the computer program may be a database management program. User 104 may use virtual reality system 100 to interact with a virtual user interface for this data management application.

As depicted, virtual reality system 100 comprises virtual reality manager 106, head-mounted system 108, and number of peripheral systems 110. In these illustrative examples, virtual reality manager 106 may be implemented using hardware, software, or a combination of the two. For example, virtual reality manager 106 may be implemented in data processing system 105.

In these illustrative examples, data processing system 105 is associated with head-mounted system 108. When one component is "associated" with another component, this association is a physical association in these examples.

For example, a first component, such as data processing system 105, may be considered to be associated with a second component, such as head-mounted system 108, by being secured to the second component, bonded to the second component, mounted to the second component, welded to the second component, fastened to the second component, electrically connected to the second component, and/or connected to the second component in some other suitable manner. The first component also may be connected to the second component using a third component. The first component may also be considered to be associated with the second component by being formed as part of and/or as an extension of the second component.

In these illustrative examples, data processing system 105 is considered part of head-mounted system 108. Of course, in other illustrative examples, virtual reality manager 106 may be implemented in a processor unit separate from head-mounted system 108 but configured to communicate with head-mounted system 108 wirelessly.

Head-mounted system 108 is configured to be worn relative to head 112 of user 104. For example, head-mounted system 108 may be worn over and/or on head 112 of user 104. Head-mounted system 108 may take a number of different forms. For example, head-mounted system 108 may take the form of a helmet, a visor, a hat, glasses, goggles, or some other suitable type of device configured to be worn over and/or on head 112 of user 104. In one illustrative example, head-mounted system 108 takes the form of glasses 114.

Any number of different components may be associated with head-mounted system 108. For example, display device 116 and sensor system 118 may be associated with head-mounted system 108. When head-mounted system 108 takes the form of glasses 114, display device 116 and sensor system 118 may be attached to, part of, and/or otherwise associated with glasses 114.

Virtual reality manager 106 is configured to visually present virtual environment 102 to user 104 on display device 116. In one illustrative example, display device 116 may be the lenses in glasses 114. Virtual reality manager 106 may visually present virtual environment 102 on these lenses such that virtual environment 102 is visually presented in front of the eyes of user 104 when user 104 is wearing glasses 114. In this manner, user 104 may feel present in virtual environment 102.

Of course, in other illustrative examples, display device 116 may take some other form. For example, display device 116 may comprise one or two contact lenses configured to be worn by user 104.

Sensor system 118 may include one or more sensors. The sensors in sensor system 118 may include, for example, without limitation, any number of microelectromechanical sensors (MEMS), nanoelectromechanical sensors (NEMS), motion sensors, angle sensors, velocity sensors, acceleration sensors, position sensors, cameras, video cameras, image sensors, and/or other suitable types of sensors. Head-mounted system 108 is configured to generate head position data 120 using sensor system 118.

In these illustrative examples, each peripheral system in number of peripheral systems 110 in virtual reality system 100 may be configured to generate and send data to virtual reality manager 106. As used herein, a "peripheral system", such as one of number of peripheral systems 110, is a system that is configured to communicate with head-mounted system 108 but that is not considered part of head-mounted system 108. Further, as used herein, a "number of" items means one or more items. For example, number of peripheral systems 110 may be one or more peripheral systems.

In these illustrative examples, each peripheral system in number of peripheral systems 110 may be configured to generate data about a particular body part of user 104. For example, a peripheral system in number of peripheral systems 110 may be configured to generate data about a hand, a foot, an arm, a leg, a torso, a finger, a toe, or another body part of user 104.

In one illustrative example, number of peripheral systems 110 includes hand system 131. Hand system 131 is configured to generate hand position data 133. Hand position data 133 may form at least a portion of peripheral position data 132 generated by number of peripheral systems 110. As used herein, "at least a portion" means some or all. Peripheral position data 132 may include data about the position of any number of body parts for user 104 over time.

Hand position data 133 may include data about at least one of left hand 124 and right hand 126 of user 104. For example, hand system 131 may comprise at least one of left hand system 121 and right hand system 122. Left hand system 121 may generate data about left hand 124 of user 104, while right hand system 122 may generate data about right hand 126 of user 104.

In these illustrative examples, left hand system 121 may take the form of left glove 128 configured for use with left hand 124 of user 104, while right hand system 122 may take the form of right glove 130 configured for use with right hand 126 of user 104. Left glove 128 and right glove 130 may be gloves configured to generate data about the position of left hand 124 and right hand 126, respectively, over time.

In particular, left glove 128 generates left hand position data 134 for left hand 124, while right glove 130 generates right hand position data 136 for right hand 126 when user 104 is wearing left glove 128 and right glove 130, respectively. Left hand position data 134 and right hand position data 136 may include data about the position of left hand 124 and right hand 126, respectively, over time, as well as data about the positions of the wrists and fingers corresponding to these hands over time.

Virtual reality manager 106 is configured to receive peripheral position data 132 from number of peripheral systems 110 and head position data 120 from sensor system 118 in head-mounted system 108. In particular, virtual reality manager 106 receives hand position data 133 and head position data 120 in substantially real-time. In other words, virtual reality manager 106 receives the position data as the position data is being generated without perceivable delays.

In these illustrative examples, virtual reality manager 106 may use hand position data 133 and head position data 120 to generate virtual image control data 135. Virtual image control data 135 may be data configured for use by virtual image application 137 to control a virtual image of virtual environment 102.

For example, virtual image application 137 is computer software configured to create virtual images of virtual environment 102. As used herein, a "virtual image" of a virtual environment, such as virtual environment 102, is an image of at least a portion of the virtual environment. In some cases, virtual image application 137 may be configured to create virtual environment 102. In other cases, virtual image application 137 may be configured to use virtual environment 102 created by another application.

Virtual reality manager 106 may be configured to communicate with virtual image application 137 using, for example, without limitation, cloud 139. Cloud 139 may be a network comprised of applications, computer programs, devices, servers, client computers, and/or other computing components connected to each other. Virtual reality manager 106 may be configured to access cloud 139 and, thereby, virtual image application 137, using, for example, without limitation, the Internet.

In these illustrative examples, virtual image application 137 is configured to generate sequence of virtual images 138 of virtual environment 102. As used herein, a "sequence of images", such as sequence of virtual images 138, is one or more images ordered with respect to time. In this manner, each virtual image in sequence of virtual images 138 corresponds to a particular time. In some illustrative examples, sequence of virtual images 138 may also be referred to as a sequence of virtual frames.

Virtual image application 137 generates each virtual image in sequence of virtual images 138 using virtual image control data 135 generated by virtual reality manager 106. For example, virtual image application 137 may use virtual image control data 135 to update a previously generated virtual image of virtual environment 102. This updated virtual image may be sent back to virtual reality manager 106. Virtual reality manager 106 may then display this updated virtual image on display device 116.

In this manner, virtual reality manager 106 may display the virtual images in sequence of virtual images 138 generated by virtual image application 137 on display device 116 as the virtual images are received from virtual image application 137. Virtual reality manager 106 displays sequence of virtual images 138 on display device 116 to visually present virtual environment 102 to user 104 on display device 116.

Virtual image 140 is an example of a virtual image in sequence of virtual images 138. Virtual image 140 may be a two-dimensional image or a three-dimensional image, depending on the implementation. Virtual image 140 corresponds to time 141. Virtual image 140 is generated using the portion of hand position data 133 and the portion of head position data 120 generated within time 141. Time 141 may be, for example, an instant in time or a period of time.

In particular, the portion of hand position data 133 and the portion of head position data 120 generated within time 141 is used to form virtual image control data 135 corresponding to time 141. Virtual image control data 135 corresponding to time 141 may be used by virtual image application 137 to form virtual image 140.

Further, virtual reality manager 106 may use head position data 120 and/or other data generated by sensor system 118 to identify frame of reference 146 for virtual image 140. Frame of reference 146 is a coordinate system for virtual image 140 with respect to virtual environment 102. In particular, frame of reference 146 is the portion of virtual environment 102 captured within virtual image 140. Frame of reference 146 is identified based on the position of head 112 of user 104. In other words, frame of reference 146 is identified based on the direction in which head 112 of user 104 is pointing.

In these illustrative examples, virtual reality manager 106 is configured to generate virtual image control data 135 using frame of reference 146 and by coordinating hand position data 133 and head position data 120. Virtual reality manager 106 may coordinate hand position data 133 and head position data 120 by synchronizing hand position data 133 and head position data 120 with respect to time. This type of synchronization may increase a level of eye-hand coordination provided to user 104.

For example, synchronization of hand position data 133 and head position data 120 with respect to time 141 may result in virtual image control data 135 that has a desired level of accuracy. When virtual image control data 135 has the desired level of accuracy, sequence of virtual images 138 of virtual environment 102 generated by virtual image application 137 may represent a substantially real-time simulation of the movement and presence of user 104 within virtual environment 102.

Further, virtual reality manager 106 may be configured to display sequence of virtual images 138 in substantially real-time. By allowing the movement of user 104 and the presence of user 104 within virtual environment 102 to be simulated in virtual environment 102 in substantially real-time, virtual reality manager 106 may allow user 104 to perform one or more tasks within virtual environment 102 with a desired level of accuracy, speed, and efficiency.

In these illustrative examples, virtual image 140 includes at least one of virtual left hand 142 and virtual right hand 144. Virtual left hand 142 may be an image that represents left hand 124 of user 104 in virtual image 140. Virtual right hand 144 may be an image that represents right hand 126 of user 104 in virtual image 140. Virtual image application 137 may determine the positions for virtual left hand 142 and virtual right hand 144 within virtual image 140 using virtual image control data 135.

Additionally, in these illustrative examples, virtual image control data 135 may also be generated using user data 145. User data 145 may include data about user 104. In particular, user data 145 may include data about the geometry of one or more body parts of user 104.

For example, user data 145 may include data about at least one of left hand 124, right hand 126, and head 112 of user 104. Data about a hand of user 104, such as left hand 124 or right hand 126, may include, for example, without limitation, measurements of the dimensions of the hand, measurements of the wrist corresponding to the hand, measurements of the fingers on the hand, measurements of a range of motion for one or more of the fingers on the hand, measurements of a distance between the fingers on the hand at rest and/or in motion, and/or other suitable types of data.

User data 145 may be identified using set of user images 150 generated by imaging system 152. As used herein, a "set of" items means one or more items. For example, set of user images 150 means one or more user images.

Imaging system 152 is not part of virtual reality system 100 in these illustrative examples. In one illustrative example, imaging system 152 may be a three-dimensional laser scanning system. In this illustrative example, set of user images 150 is a set of three-dimensional laser scans of user 104 that captures the geometry of left hand 124 and right hand 126 of user 104. Further, this set of three-dimensional laser scans may also capture the geometry of the wrists and fingers of user 104.

In one illustrative example, virtual reality manager 106 may be configured to receive set of user images 150 and identify user data 145 using set of user images 150. In another illustrative example, user data 145 may be uploaded directly into virtual reality manager 106. In yet another illustrative example, user data 145 may be set of user images 150.

When virtual image 140 is displayed on display device 116 to user 104, user 104 sees virtual left hand 142 and virtual right hand 144. In particular, user 104 sees virtual left hand 142 and virtual right hand 144 in virtual image 140 in positions that correspond to the real positions of left hand 124 and right hand 126, respectively. In this manner, user 104 may feel present in virtual environment 102.

In some illustrative examples, number of peripheral systems 110 and/or sensor system 118 in head-mounted system 108 may generate additional data 154 in addition to position data. Additional data 154 may be used to generate virtual image control data 135. For example, additional data 154 may be used to generate data that may be used by virtual image application 137 to control one or more interactive controls in virtual environment 102.

In one illustrative example, additional data 154 may include pressure data for the fingers on left hand 124 and right hand 126. In other illustrative examples, additional data 154 may include image data. Of course, in still other illustrative examples, additional data 154 may include other types of sensor data.

In some illustrative examples, virtual reality manager 106 may also be configured to communicate with group of virtual reality systems 156 using cloud 139. Each virtual reality system in group of virtual reality systems 156 may comprise a virtual reality manager that may be implemented in a manner similar to virtual reality manager 106. Cloud 139 may allow different virtual reality managers to interact with virtual image application 137 at the same time. In some cases, cloud 139 may allow different users to interact with each other within virtual environment 102.

Figure 2:
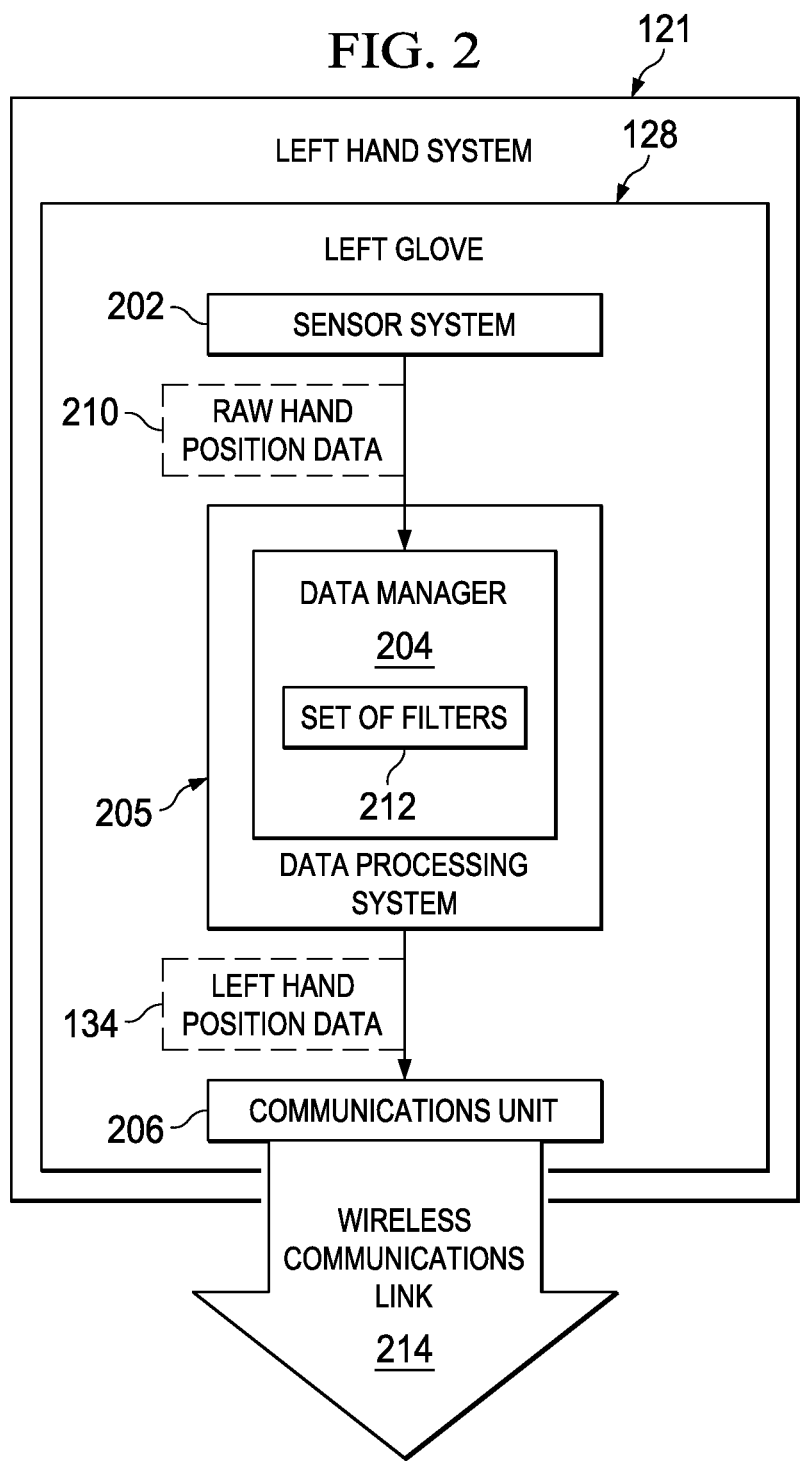
FIG. 2 is an illustration of a hand system in the form of a block diagram in accordance with an illustrative embodiment.

With reference now to FIG. 2, an illustration of a left hand system in the form of a block diagram is depicted in accordance with an illustrative embodiment. In FIG. 2, an example of one implementation for left hand system 121 from FIG. 1 is depicted. The configuration depicted for left hand system 121 may also be used to implement right hand system 122 in FIG. 1.

As depicted, left hand system 121 takes the form of left glove 128. Left glove 128 is configured to substantially conform to left hand 124 of user 104 in FIG. 1. As one illustrative example, left glove 128 may be fabricated based on a set of user images, such as, for example, set of user images 150 in FIG. 1, and/or user data, such as user data 145 in FIG. 1. Set of user images 150 may be used to fabricate a glove that substantially conforms to left hand 124 of user 104. For example, left glove 128 may be fabricated using a material configured to substantially conform to left hand 124 of user 104. Further, left glove 128 may be fabricated having dimensions that substantially match the geometry of left hand 124.

In this illustrative example, left glove 128 comprises sensor system 202, data manager 204, and communications unit 206. Sensor system 202 comprises a number of sensors selected from a group comprising microelectromechanical sensors, nanoelectromechanical sensors, motion sensors, angle sensors, position sensors, velocity sensors, acceleration sensors, cameras, video cameras, image sensors, pressure sensors, tactile sensors, and/or other suitable types of sensors.

Sensor system 202 may be integrated into the material used to fabricate left glove 128 in some illustrative examples. For example, one or more sensors in sensor system 202 may be integrated into the material used to fabricate left glove 128 in a manner such that these sensors may not be visible to user 104. The position of each sensor in sensor system 202 with respect to left glove 128 may be determined using, for example, without limitation, set of user images 150 and/or user data 145 in FIG. 1.

As depicted, sensor system 202 is configured to generate raw hand position data 210 for left hand 124 of user 104. Raw hand position data 210 may comprise, for example, without limitation, a set of dynamic system state variables (DSSV).

In some illustrative examples, sensor system 202 may be calibrated using set of user images 150 and/or user data 145. As one illustrative example, these images may be used to impose constraints on raw hand position data 210 generated by sensor system 202.

Data manager 204 may comprise hardware, software, or a combination of the two. For example, data manager 204 may be implemented within data processing system 205. In some illustrative examples, data processing system 205 may be implemented within sensor system 202. In other illustrative examples, data processing system 205 may be implemented within left glove 128 separate from sensor system 202.

In still other illustrative examples, data processing system 205 may be associated with left glove 128 in some other suitable manner. For example, without limitation, data processing system 205 may be a wristwatch-type device associated with left glove 128.

Data manager 204 is configured to modify raw hand position data 210 to form left hand position data 134. Data manager 204 may modify raw hand position data 210 using set of filters 212. Set of filters 212 may include, for example, without limitation, any number of motion smoothing filters, jitter filters, Kalman filters, and/or other suitable types of filters. Further, data manager 204 may also modify raw hand position data 210 based on constraints identified for the movement of left hand 124 of user 104 based on set of user images 150 in FIG. 1.

In this manner, left hand position data 134 may compensate for undesired movement of one or more sensors in sensor system 202 while raw hand position data 210 is being generated. This undesired movement may include, for example, shaking, vibrations, jitter, and/or other suitable types of undesired movement.

In some cases, left hand position data 134 may also compensate for imprecise gestures and undesired movement of left hand 124 of user 104. For example, left hand position data 134 may compensate for undesired spikes in the motion of left hand 124 in response to an undesired jerking type of motion of left hand 124. In these illustrative examples, modifying raw hand position data 210 to form left hand position data 134 may be referred to as stabilizing raw hand position data 210.

Data manager 204 sends left hand position data 134 to virtual reality manager 106 in FIG. 1 using communications unit 206. Communications unit 206 is used to form one or more wireless communications links between left glove 128 and other peripheral systems and/or head-mounted system 108. As one illustrative example, communications unit 206 forms wireless communications link 214 with head-mounted system 108. Communications unit 206 may transmit left hand position data 134 to head-mounted system 108 in FIG. 1 over wireless communications link 214 using, for example, without limitation, radio frequency (RF) signals.

In some illustrative examples, data manager 204 may also be used to calibrate sensor system 202. In other illustrative examples, data manager 204 may be configured to modify raw hand position data 210 to electronically compensate for mounting issues with sensor system 202.

Figure 3:
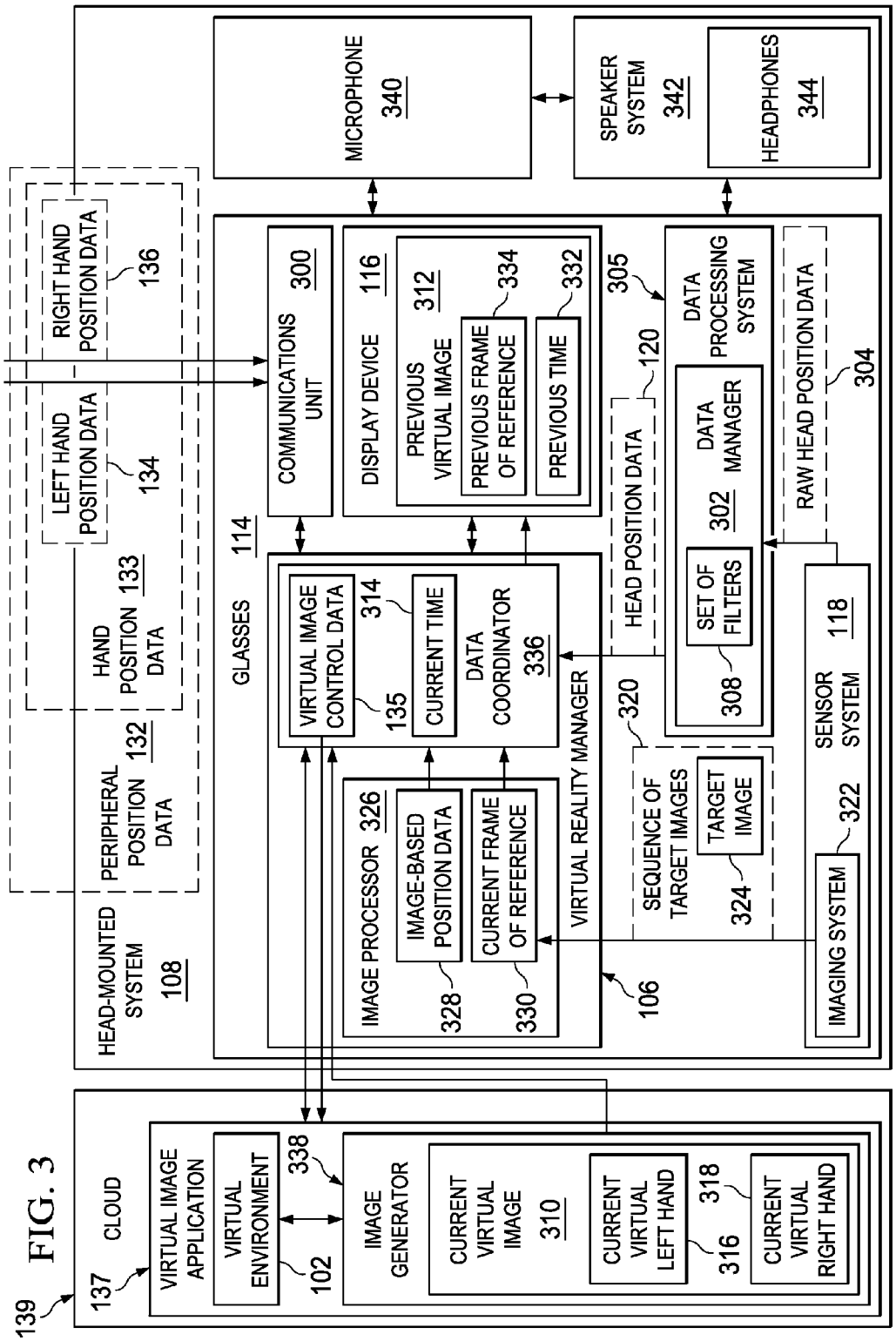
FIG. 3 is an illustration of a head-mounted system in the form of a block diagram in accordance with an illustrative embodiment.

Turning now to FIG. 3, an illustration of a head-mounted system in the form of a block diagram is depicted in accordance with an illustrative embodiment. In FIG. 3, an example of one implementation for head mounted-system 108 from FIG. 1 is depicted.

In this illustrative example, head-mounted system 108 takes the form of glasses 114. As depicted, virtual reality manager 106, display device 116, sensor system 118, data manager 302, and communications unit 300 are associated with glasses 114. In particular, virtual reality manager 106, display device 116, sensor system 118, data manager 302, and communications unit 300 are part of glasses 114 in this example.

Communications unit 300 is configured to form any number of wireless communications links to allow communications between head-mounted system 108 and a number of other systems, such as, for example, number of peripheral systems 110 in FIG. 1. For example, head-mounted system 108 may receive peripheral position data 132 from number of peripheral systems 110 in FIG. 1 using communications unit 300.

In particular, virtual reality manager 106 receives left hand position data 134 from left hand system 121 in FIG. 1 and right hand position data 136 from right hand system 122 in FIG. 1 using communications unit 300. For example, communications unit 300 may receive left hand position data 134 from left glove 128 using wireless communications link 214 established between communications unit 300 and communications unit 206 of left glove 128 in FIG. 2.

As depicted, sensor system 118 is configured to generate raw head position data 304. Raw head position data 304 may comprise, for example, without limitation, a set of dynamic system state variables (DSSV). In some illustrative examples, sensor system 118 may be calibrated using set of user images 150 in FIG. 1.

In these illustrative examples, data manager 302 may be implemented using hardware, software, or a combination of the two. In one illustrative example, data manager 302 may be implemented within data processing system 305. In some cases, data processing system 305 may be associated with data processing system 105 in FIG. 1. In other cases, data processing system 305 may be associated with sensor system 118. In some illustrative examples, data manager 302 may be implemented within data processing system 105 in FIG. 1 instead of data processing system 305.

Data manager 302 is configured to modify raw head position data 304 to form head position data 120 in FIG. 1. Data manager 302 may modify raw head position data 304 using set of filters 308. Set of filters 308 may include, for example, without limitation, any number of motion smoothing filters, jitter filters, Kalman filters, and/or other suitable types of filters. Further, data manager 302 may also modify raw head position data 304 based on constraints identified for the movement of head 112 of user 104 using set of user images 150 in FIG. 1.

In this manner, head position data 120 may be used to compensate for undesired movement of one or more sensors in sensor system 118 while raw head position data 304 is being generated. This undesired movement may include, for example, shaking, vibrations, jitter, and/or other suitable types of undesired movement.

Further, in some cases, head position data 120 may also be used to compensate for undesired movement of head 112 of user 104. For example, head position data 120 may compensate for undesired spikes in the motion of head 112 in response to an undesired jerking type of motion of head 112. In these illustrative examples, modifying raw head position data 304 to form head position data 120 may be referred to as stabilizing raw head position data 304. Data manager 302 sends head position data 120 to virtual reality manager 106.

In some illustrative examples, data manager 302 may also be used to calibrate sensor system 118. In other illustrative examples, data manager 302 may be configured to modify raw head position data 304 to electronically compensate for mounting issues with sensor system 118.

Additionally, sensor system 118 includes imaging system 322 in this illustrative example. Imaging system 322 comprises one or more cameras configured to point in a substantially same direction in which head 112 of user 104 is pointed. Imaging system 322 is configured to have a field of view that is wide enough and deep enough to capture a number of visual targets on number of peripheral systems 110. These visual targets may include, for example, visual markers, labels, buttons, contours, shapes, and/or other suitable types of visual targets.

As one illustrative example, a number of visual markers may be present on each of left glove 128 and right glove 130 in FIG. 1. Imaging system 322 is configured to have a field of view wide enough and deep enough to capture these visual markers in a target image generated by imaging system 322.

In this illustrative example, target image 324 is an example of one of sequence of target images 320. Target image 324 is generated by imaging system 322 at current time 314. Image processor 326 in virtual reality manager 106 is configured to generate image-based position data 328 using target image 324. Image-based position data 328 identifies the positions of left glove 128 and right glove 130 within target image 324 at current time 314. These positions are identified using the visual targets on left glove 128 and right glove 130.

Further, image processor 326 is also configured to use target image 324 to identify current frame of reference 330 for current virtual image 310. Current frame of reference 330 may be, for example, the portion of virtual environment 102 that corresponds to target image 324. For example, a first target image that captures an area to the left of an area captured in a second target image corresponds to a portion of virtual environment 102 that is to the left of the portion of virtual environment 102 corresponding to the second target image.

Image processor 326 is configured to send current frame of reference 330 and image-based position data 328 to data coordinator 336. Data coordinator 336 uses current frame of reference 330, image-based position data 328, head position data 120, left hand position data 134, and right hand position data 136 to generate virtual image control data 135 for current time 314. In particular, data coordinator 336 uses head position data 120, left hand position data 134, and right hand position data 136 generated at current time 314 to form virtual image control data 135 for current time 314.

Virtual image control data 135 may include, for example, a position for left glove 128 and right glove 130 in FIG. 1 with respect to current frame of reference 330 that may be used to control, for example, a position of a virtual left hand and a virtual right hand within a virtual image of virtual environment 102. In the illustrative examples, data coordinator 336 sends virtual image control data 135 to virtual image application 137 for processing.

Virtual image application 137 may include image generator 338. Image generator 338 uses virtual image control data 135 to form current virtual image 310 of virtual environment 102 for current time 314. Current virtual image 310 is based on current frame of reference 330. Current virtual image 310 may be the virtual image being formed for display on display device 116. In other words, current virtual image 310 has not yet been displayed on display device 116 in this example.

In this example, current virtual image 310 may be an updated version of previous virtual image 312 currently being displayed on display device 116. Previous virtual image 312 may have been generated by virtual image application 137 for previous time 332. Current frame of reference 330 used for forming current virtual image 310 may be the same as or different from previous frame of reference 334 used for generating previous virtual image 312.

As depicted, current virtual image 310 includes current virtual left hand 316 and current virtual right hand 318. The positions for current virtual left hand 316 and current virtual right hand 318 may be based on the positions identified for left glove 128 and right glove 130 in virtual image control data 135.

Once current virtual image 310 has been generated by image generator 338, virtual image application 137 sends current virtual image 310 to data coordinator 336. Data coordinator 336 sends current virtual image 310 to display device 116 such that current virtual image 310 may be displayed on display device 116 in the place of previous virtual image 312.

In this manner, virtual reality manager 106 and virtual image application 137 may communicate with each other to form sequence of virtual images 138 in FIG. 1 for a plurality of times spanning a particular period of time. The virtual images in sequence of virtual images 138 may be displayed on display device 116 as the images are generated in substantially real-time such that the different positions for the virtual left hand and virtual right hand in the virtual images over the particular period of time simulate movement of left hand 124 and right hand 126, respectively, of user 104 in FIG. 1.

In some illustrative examples, head-mounted system 108 may also include microphone 340 and/or speaker system 342. User 104 may use microphone 340 to generate audio data for use by virtual reality manager 106. Further, virtual reality manager 106 may be configured to generate sounds using speaker system 342. These sounds may allow user 104 to be further immersed in virtual environment 102. Speaker system 342 may take the form of, for example, headphones 344.

Figure 4:
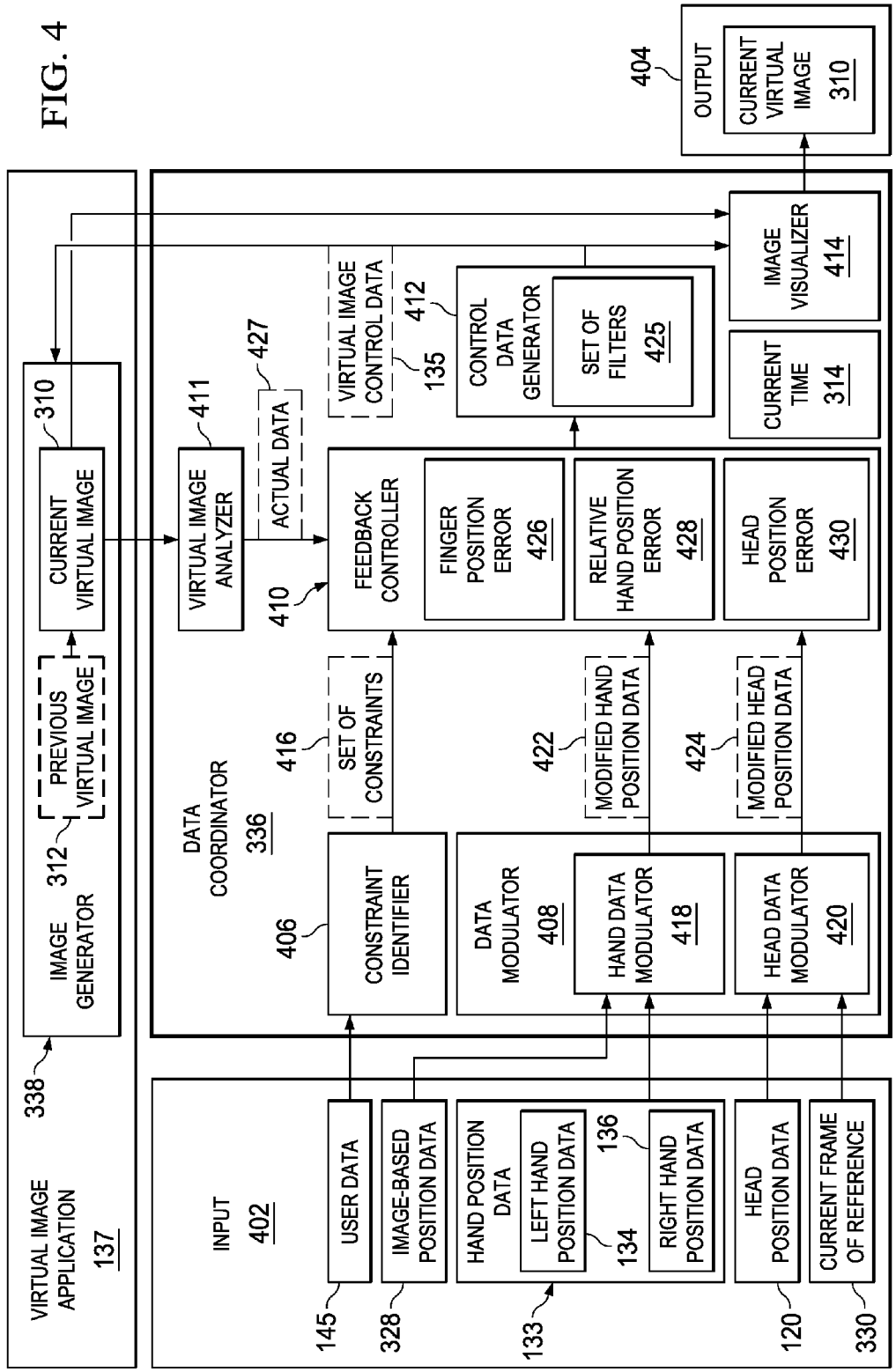
FIG. 4 is an illustration of a data coordinator in the form of a block diagram in accordance with an illustrative embodiment.

With reference now to FIG. 4, an illustration of a data coordinator in the form of a block diagram is depicted in accordance with an illustrative embodiment. In FIG. 4, an example of one implementation for data coordinator 336 from FIG. 3 is depicted.

In this illustrative example, data coordinator 336 is configured to receive input 402 for use in forming current virtual image 310 for current time 314. In response to receiving input 402, data coordinator 336 generates output 404. Input 402 may include, for example, without limitation, user data 145, image-based position data 328, hand position data 133, head position data 120, current frame of reference 330, and/or other suitable data. Image-based position data 328, hand position data 133, head position data 120, and current frame of reference 330 may be data corresponding to current time 314. Output 404 may be current virtual image 310.

As illustrated in this figure, data coordinator 336 includes constraint identifier 406, data modulator 408, feedback controller 410, virtual image analyzer 411, control data generator 412, and image visualizer 414. In this illustrative example, constraint identifier 406 identifies set of constraints 416 for forming virtual image control data 135 based on, for example, without limitation, user data 145. Set of constraints 416 may include, for example, constraints on the positions and/or movement of left hand 124, right hand 126, and/or head 112 of user 104 in FIG. 1. Constraint identifier 406 sends set of constraints 416 to feedback controller 410.

As depicted, data modulator 408 includes hand data modulator 418 and head data modulator 420. Hand data modulator 418 is configured to use both image-based position data 328 and hand position data 133 to form modified hand position data 422. Modified hand position data 422 may be formed by applying weights to image-based position data 328 and hand position data 133. These weights may be based on, for example, a speed of movement of left hand 124 and/or right hand 126 of user 104.

In this illustrative example, image-based position data 328 may provide a more accurate position for a hand of user 104 than hand position data 133 generated using a sensor system on a glove for the hand over time. In particular, image-based position data 328 may provide more accurate data than hand position data 133 when the hand is moving slowly. Hand position data 133 may provide more accurate data than image-based position data 328 when the hand is moving quickly.

Consequently, when a hand of user 104 is moving quickly enough, hand data modulator 418 applies weights to the corresponding hand position data in hand position data 133 that are higher than the weights applied to image-based position data 328. On the other hand, when a hand of user 104 is moving slowly enough, hand data modulator 418 applies weights to the corresponding hand position data in hand position data 133 that are lower than the weights applied to image-based position data 328. The speed at which the weights are applied may vary, depending on the particular implementation.

Further, head data modulator 420 is configured to use both head position data 120 and current frame of reference 330 to form modified head position data 424. Head data modulator 420 may combine head position data 120 and current frame of reference 330 and weight these two types of data to form modified head position data 424. Current frame of reference 330 may be weighted higher than head position data 120 when head 112 of user 104 is moving slowly. Head position data 120 may be weighted higher than current frame of reference 330 when head 112 of user 104 is moving quickly.

Data modulator 408 sends modified hand position data 422 and modified head position data 424 to feedback controller 410. Further, data modulator 408 sends modified hand position data 422 and modified head position data 424 to control data generator 412. Control data generator 412 is configured to use modified hand position data 422 and modified head position data 424 to form virtual image control data 135.

For example, control data generator 412 may use set of filters 425 to form virtual image control data 135. Set of filters 425 may be configured to smooth out modified hand position data 422 and modified head position data 424, remove undesired discontinuities in modified hand position data 422 and modified head position data 424, and synchronize modified hand position data 422 and modified head position data 424 with respect to time. Control data generator 412 sends virtual image control data 135 to virtual image application 137.

Image generator 338 in virtual image application 137 is configured to generate current virtual image 310 using virtual image control data 135. In particular, image generator 338 updates previous virtual image 312 to form current virtual image 310 of virtual environment 102 in FIG. 1. Image generator 338 sends current virtual image 310 to virtual image analyzer 411 and image visualizer 414.

In this illustrative example, virtual image analyzer 411 is configured to analyze current virtual image 310 to generate actual data 427 based on current virtual image 310. For example, virtual image analyzer 411 may decompose current virtual image 310 to generate actual data 427 that identifies the actual position for head 112 of user 104, the actual position for left hand 124 of user 104, and/or the actual position for right hand 126 of user 104 in FIG. 1 based on current virtual image 310. Virtual image analyzer 411 sends actual data 427 to feedback controller 410.

Feedback controller 410 is configured to use actual data 427, set of constraints 416, modified hand position data 422, and modified head position data 424 to form finger position error 426, relative hand position error 428, and head position error 430. Finger position error 426 may be the difference between the positions of the fingers of user 104 identified in modified hand position data 422 and the positions of the fingers of user 104 simulated in current virtual image 310.

Further, relative hand position error 428 may be the difference between the positions of the hands of user 104 identified in modified hand position data 422 and the positions of the virtual hands in current virtual image 310 with respect to the position of head 112 of user 104 and/or current frame of reference 330. Head position error 430 may be the difference between the position of head 112 of user 104 identified in modified head position data 424 and the position of head 112 of user 104 indicated based on current virtual image 310.

In some illustrative examples, feedback controller 410 may send finger position error 426, relative hand position error 428, and head position error 430 to control data generator 412 to adjust virtual image control data 135. Of course, in some illustrative examples, the process of sending virtual image control data 135 to image generator 338 and feedback controller 410 using current virtual image 310 to adjust virtual image control data 135 may be repeated until virtual image control data 135 has a desired level of accuracy. In other words, this process may loop until finger position error 426, relative hand position error 428, and head position error 430 are within selected tolerances.

Virtual image control data 135 that has been adjusted to have the desired level of accuracy may then be used by image visualizer 414 to adjust current virtual image 310. Image visualizer 414 may then output current virtual image 310 that has been adjusted.

In this manner, virtual image control data 135 generated over time with the desired level of accuracy may be used to generate sequence of virtual images 138 in FIG. 1. When virtual image control data 135 is generated with the desired level of accuracy, sequence of virtual images 138 may provide user 104 with a desired level of eye-hand coordination. In other words, the positions of the virtual left hands and the virtual right hands in these virtual images may have a desired level of accuracy. Further, movement of head 112, left hand 124, and/or right hand 126 of user 104 may be simulated within sequence of virtual images 138 with a desired level of accuracy.

Figure 5:
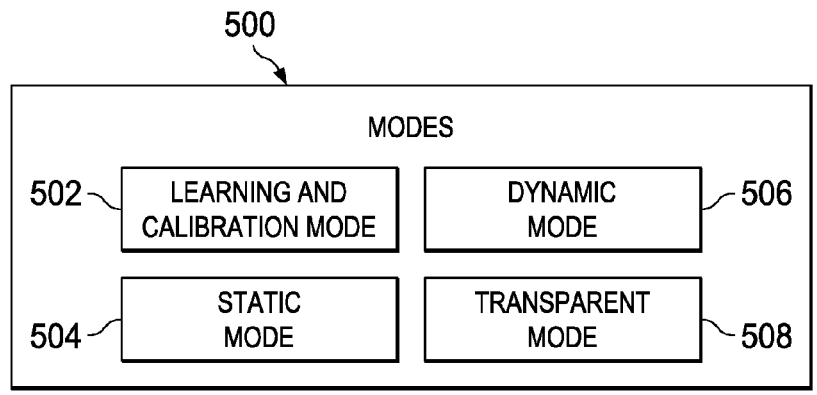
FIG. 5 is an illustration of modes of operation for a virtual reality system in the form of a block diagram in accordance with an illustrative embodiment.

With reference now to FIG. 5, an illustration of modes of operation for a virtual reality system is depicted in accordance with an illustrative embodiment. In this illustration example, modes 500 may be modes of operations for virtual reality system 100 in FIG. 1. As depicted, modes 500 may include at least one of learning and calibration mode 502, static mode 504, dynamic mode 506, and transparent mode 508. Of course, in other illustrative examples, modes 500 may include one or more other modes in addition to or in place of these modes.

In learning and calibration mode 502, user 104 in FIG. 1 may perform an actual task while using at least one of hand system 131 and head-mounted system 108 in FIG. 1. This actual task may be, for example, a non-virtual task that is performed in reality and not in virtual reality. This non-virtual task may be, for example, without limitation, typing on a keyboard, playing a piano, playing a guitar, using different types of equipment, performing a medical procedure, performing a physical task, or some other suitable type of non-virtual task.

In learning and calibration mode 502, virtual reality manager 106 uses at least one of hand position data 133 generated by hand system 131 and head position data 120 to calibrate virtual reality system 100 in FIG. 1. For example, virtual reality manager 106 may use the data collected while user 104 is performing the non-virtual task to correct for inconsistencies in the data generated when user 104 performs a corresponding virtual task using virtual reality system 100.

In static mode 504, user 104 may use virtual reality system 100 to perform a virtual task in which only the hands of user 104 may be used. For example, user 104 may use left hand 124 and/or right hand 126 in FIG. 1 to perform the virtual task. In static mode 504, all of the virtual images in sequence of virtual images 138 displayed to user 104 may remain stationary despite any movement of head 112 of user 104 in FIG. 1.

For example, frame of reference 146 in FIG. 1 for all of the virtual images in sequence of virtual images 138 may remain fixed and pointed towards the virtual device being controlled by hand system 131. The positions of virtual left hand 142, virtual right hand 144, and/or other virtual components may change between the different virtual images in sequence of virtual images 138 in FIG. 1, while frame of reference 146 remains stationary. In one illustrative example, virtual reality manager 106 may be configured to filter out any head position data 120 generated by sensor system 118 in head-mounted system 108 in FIG. 1, while user 104 performs the virtual task.

In dynamic mode 506, both hand position data 133 and head position data 120 are used by virtual reality manager 106 to control sequence of virtual images 138 displayed to user 104. Frame of reference 146 for each image in sequence of virtual images 138 may change based on the movement of head 112 of user 104.

In transparent mode 508, no virtual images are displayed on display device 116 in FIG. 1. Instead, user 104 may be allowed to see through glasses 114 in FIG. 1. In other words, in transparent mode 508, the lenses of glasses 114 may be made transparent.

The illustrations of virtual reality system 100 in FIG. 1, left hand system 121 in FIG. 2, head-mounted system 108 in FIG. 3, data coordinator 336 in FIG. 4, and modes 500 in FIG. 5 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

In some illustrative examples, virtual image application 137 may be implemented within virtual reality system 100 in FIG. 1. For example, virtual image application 137 may be implemented within data processing system 105. In other illustrative examples, data manager 204 may be implemented separately from sensor system 202 in FIG. 2.

In some cases, other modes may be included in modes 500 of operation for virtual reality system 100 in addition to and/or in place of the ones described in FIG. 5. In one illustrative example, learning and calibration mode 502 may be separated into a learning mode and a calibration mode.

Figure 6:
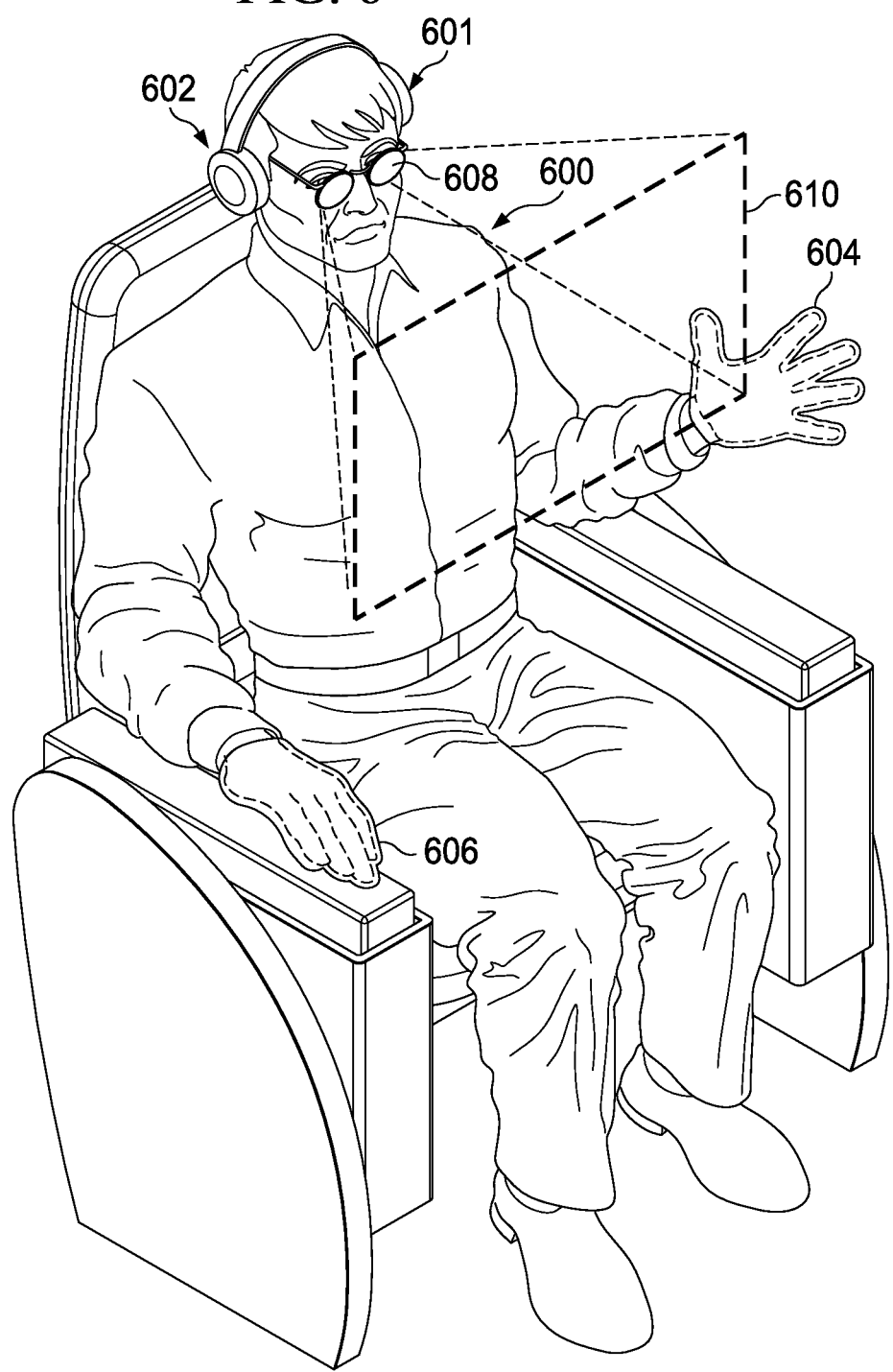
FIG. 6 is an illustration of a user using a virtual reality system in accordance with an illustrative embodiment.

With reference now to FIG. 6, an illustration of a user using a virtual reality system is depicted in accordance with an illustrative embodiment. In this illustrative example, user 600 is wearing virtual reality system 601. User 600 is an example of user 104 in FIG. 1. Further, virtual reality system 601 is an example of one implementation for virtual reality system 100 in FIG. 1.

As depicted, virtual reality system 601 includes head-mounted system 602, left glove 604, and right glove 606. Head-mounted system 602 is an example of one implementation for head-mounted system 108 in FIGS. 1 and 3. As depicted, head-mounted system 602 includes glasses 608. Glasses 608 are an example of one implementation for glasses 114 in FIGS. 1 and 3. Further, left glove 604 and right glove 606 are examples of implementations for left glove 128 and right glove 130, respectively, in FIG. 1.

In this illustrative example, a virtual reality manager, such as virtual reality manager 106 in FIG. 1, may visually present virtual image 610 on glasses 608 in front of the eyes of user 600. Virtual image 610 may be an example of one implementation for virtual image 140 in FIG. 1. Further, virtual image 610 is an image of a virtual environment. The virtual reality manager is configured to use data generated by left glove 604, right glove 606, and head-mounted system 602 in response to movement of user 600 to allow user 600 to control and interact with this virtual environment.

Figure 7:
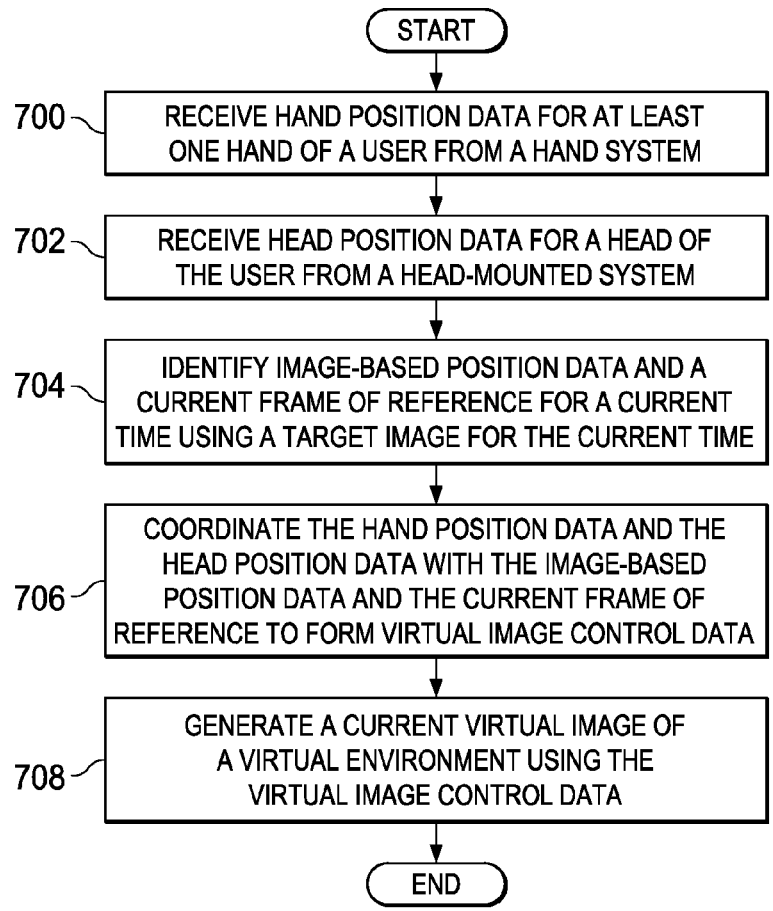
FIG. 7 is an illustration of a process for interacting with a virtual engineering environment in the form of a flowchart in accordance with an illustrative embodiment.

With reference now to FIG. 7, an illustration of a process for interacting with a virtual engineering environment in the form of a flowchart is depicted in accordance with an illustrative embodiment. The process illustrated in FIG. 7 may be implemented using virtual reality system 100 in FIG. 1. In particular, this process may be implemented using virtual reality manager 106 in communication with virtual image application 137 in FIGS. 1 and 3.

The process may begin by receiving hand position data for at least one hand of a user from a hand system (operation 700). Hand position data may include position data for a left hand and/or a right hand of a user. The hand system may comprise a left glove for the left hand of the user and/or a right glove for the right hand of the user. The hand system may be, for example, hand system 131 in FIG. 1.

The process may then receive head position data for the head of the user from a head-mounted system (operation 702). The head-mounted system may be, for example, head-mounted system 108 in FIGS. 1 and 3. In one illustrative example, the head-mounted system may take the form of glasses 114 in FIGS. 1 and 3.

Thereafter, the process identifies image-based position data and a current frame of reference for a current time using a target image for the current time (operation 704). Operation 704 may be performed using, for example, image processor 326 in FIG. 3. The target image may be, for example, target image 324 generated using imaging system 322 in sensor system 118 associated with head-mounted system 108 in FIG. 3. Target image 324 allows a position for left glove 128 and right glove 130 in target image 324 to be identified.

The process then coordinates the hand position data and the head position data with the image-based position data and the current frame of reference to form virtual image control data (operation 706). Operation 706 may be performed using, for example, data coordinator 336 in FIGS. 3 and 4. Then, the process generates a current virtual image of a virtual environment using the virtual image control data (operation 708), with the process terminating thereafter.

Figure 8:
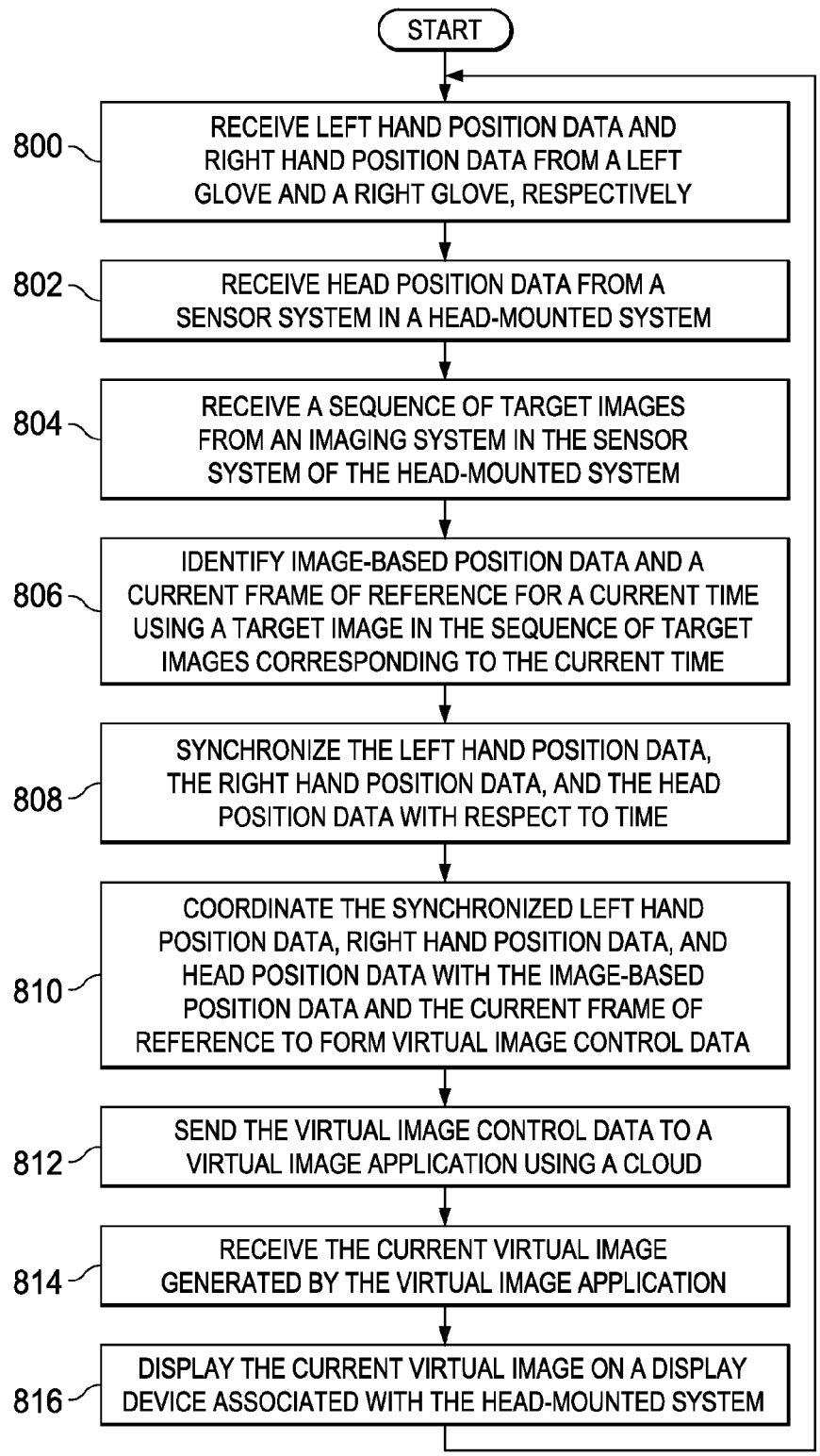
FIG. 8 is an illustration of a process for interacting with a virtual engineering environment in the form of a flowchart in accordance with an illustrative embodiment.

With reference now to FIG. 8, an illustration of a process for interacting with a virtual engineering environment in the form of a flowchart is depicted in accordance with an illustrative embodiment. The process illustrated in FIG. 8 may be implemented using virtual reality system 100 in FIG. 1. Further, this process is a more-detailed process of the process described in FIG. 7.

The process begins by receiving left hand position data and right hand position data from a left glove and a right glove, respectively (operation 800). The left hand position data identifies positions for a left hand of a user over time. The right hand position data identifies positions for a right hand of the user over time.

Further, the process receives head position data from a sensor system in a head-mounted system (operation 802). The head position data identifies positions for the head of the user over time.

The process then receives a sequence of target images from an imaging system in the sensor system of the head-mounted system (operation 804). Thereafter, the process identifies image-based position data and a current frame of reference for a current time using a target image in the sequence of target images corresponding to the current time (operation 806).

Next, the process synchronizes the left hand position data, the right hand position data, and the head position data with respect to time (operation 808). The process then coordinates the synchronized left hand position data, right hand position data, and head position data with the image-based position data and the current frame of reference to form virtual image control data (operation 810).

The process sends the virtual image control data to a virtual image application using a cloud (operation 812). The virtual image application is configured to use the virtual image control data to generate a current virtual image of a virtual environment for the current time. Next, the process receives the current virtual image generated by the virtual image application (operation 814).

The process displays the current virtual image on a display device associated with the head-mounted system (operation 816), with the process returning to operation 800. In operation 800, the current virtual image replaces a previously-generated virtual image displayed on the display device. The user sees the current virtual image and may feel present in the virtual environment.

When the process returns to operation 800 after performing operation 816 and repeats operations 802, 804, and 806, the current time used in operation 806 is a time after the current time for the current virtual image in operation 816. In other words, the process described in FIG. 8 may be repeated to form a next virtual image. In this manner, a sequence of virtual images ordered with respect to time may be generated and displayed on the display device.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
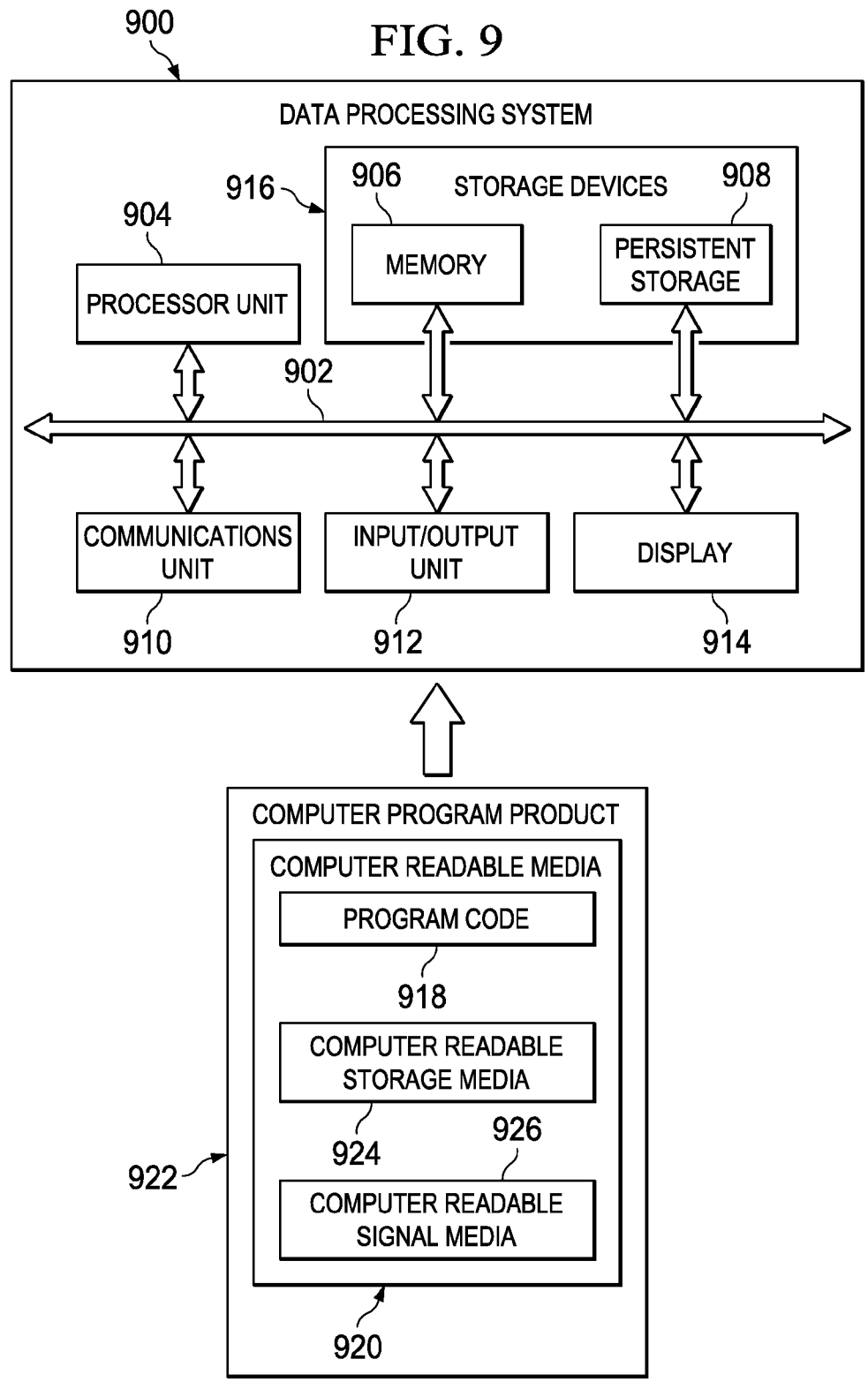
FIG. 9 is an illustration of a data processing system in accordance with an illustrative embodiment.

Turning now to FIG. 9, an illustration of a data processing system is depicted in accordance with an illustrative embodiment. In this illustrative example, data processing system 900 may be used to implement data processing system 105 in FIG. 1. In this illustrative example, data processing system 900 includes communications framework 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. A number, as used herein with reference to an item, means one or more items. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer-implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908. Computer readable storage media 924 also may take the form of a persistent storage, such as a hard drive, a thumb drive, or a flash memory, that is connected to data processing system 900. In some instances, computer readable storage media 924 may not be removable from data processing system 900.

In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900. Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 918 may be omitted, because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 906 or a cache, such as found in an interface and memory controller hub that may be present in communications framework 902.

Thus, the different illustrative embodiments provide a method and apparatus for generating virtual images of a virtual environment. In one illustrative embodiment, a method for generating a virtual image of a virtual environment is provided. A virtual reality manager receives hand position data for at least one hand of a user from a hand system. The virtual reality manager receives head position data for the head of the user from a head-mounted system. The virtual reality manager identifies image-based position data and a current frame of reference for a current time using a target image corresponding to the current time. The virtual reality manager generates virtual image control data for the current time using the hand position data, the head position data, the image-based position data, and the current frame of reference. The virtual image control data is configured for use by a virtual image application.

The different illustrative embodiments provide a method and system for allowing a user to interact with a virtual environment. In particular, virtual reality system 100 in FIG. 1 allows a user, such as user 104 in FIG. 1, to interact with a virtual image application, such as virtual image application 137 in FIG. 1. The user may interact with the virtual image application in a manner that affects the virtual environment managed using the virtual image application.

Virtual reality system 100 may be used to perform virtual engineering. For example, a user may use virtual reality system 100 to interact with a virtual engineering environment. Virtual reality system 100 is configured to provide a desired level of eye-hand coordination such that the user may experience a desired level of immersion within the virtual engineering environment.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A method for generating a virtual image of a virtual environment, the method comprising:
 receiving, at a virtual reality manager, hand position data for at least one hand of a user from a hand system;
 receiving, at the virtual reality manager, head position data for a head of the user from a head-mounted system;
 identifying, by the virtual reality manager, image-based position data and a current frame of reference for a current time using a target image corresponding to the current time;
 generating, by the virtual reality manager, virtual image control data for the current time using the hand position data, the head position data, the image-based position data, and the current frame of reference, wherein the virtual image control data is configured for use by a virtual image application; and
 generating, via a feedback controller, the virtual image control data with a desired level of accuracy using a finger position error, a relative hand position error, and a head position error;
 wherein finger position error is a difference between positions of fingers identified in the hand position data and positions of the fingers simulated in a current virtual image;

wherein relative hand position error is a difference between positions of hands identified in the hand position data and positions of virtual hands in the current virtual image; and wherein head position error is a difference between position of the head identified in the head position data and position of the head in the current virtual image.

2. The method of claim 1 further comprising:
sending, by the virtual reality manager, the virtual image control data to the virtual image application; and
generating, by the virtual image application, the current virtual image of the virtual environment for the current time using the virtual image control data for the current time.

3. The method of claim 2, wherein the step of generating the current virtual image of the virtual environment for the current time using the virtual image control data for the current time comprises:
positioning a virtual left hand and a virtual right hand in the current virtual image based on the virtual image control data, wherein the virtual left hand is an image representing a left hand of the user and the virtual right hand is an image representing a right hand of the user.

4. The method of claim 2 further comprising:
displaying, by the virtual reality manager, the current virtual image of the virtual environment to the user on a display device associated with the head-mounted system, wherein the current virtual image replaces a previous virtual image displayed on the display device.

5. The method of claim 1, wherein the step of generating the virtual image control data for the current time using the hand position data, the head position data, the image-based position data, and the current frame of reference comprises:
synchronizing, by the virtual reality manager, the hand position data and the head position data with respect to time.

6. The method of claim 1 further comprising:
generating left hand position data using a left glove configured to substantially conform to a left hand of the user; and
generating right hand position data using a right glove configured to substantially conform to a right hand of the user, wherein the left hand position data and the right hand position data form the hand position data.

7. The method of claim 1, wherein the step of generating the virtual image control data for the current time comprises:
identifying modified hand position data using left hand position data in the hand position data, right hand position data in the right hand position data, and the image-based position data;
identifying modified head position data using the head position data and the current frame of reference; and
generating the virtual image control data using the modified hand position data, the modified head position data, and a set of constraints.

8. The method of claim 7, wherein the step of generating the virtual image control data for the current time further comprises:
identifying the set of constraints using user data, wherein the user data is based on a set of user images.

9. The method of claim 7, wherein the step of generating the virtual image control data using the modified hand position data, the modified head position data, and the set of constraints comprises:
identifying the finger position error, the relative hand position error, and the head position error using the feedback controller, the modified hand position data, the modified head position data, and the set of constraints.

10. The method of claim 1, wherein the virtual environment is a simulation of an engineering environment selected from one of a design environment, a manufacturing environment, a computer environment, a testing environment, a data management environment, an inspection environment, and an operations environment.

11. The method of claim 1 further comprising:
filtering out the head position data to use only the hand position data when in a static mode;
using the head position data and the hand position data when in a dynamic mode; and
displaying no virtual images when in a transparent mode.

12. A virtual reality system comprising:
a head-mounted system configured to be worn relative to a head of a user; and
a virtual reality manager associated with the head-mounted system, wherein the virtual reality manager is configured to:
receive hand position data for at least one hand of the user from a hand system;
receive head position data for the head of the user from a sensor system in the head-mounted system;
identify image-based position data and a current frame of reference for a current time using a target image corresponding to the current time; and
generate virtual image control data for the current time using the hand position data, the head position data, the image-based position data, and the current frame of reference, wherein the virtual image control data is configured for use by a virtual image application; and
a control data generator of a data coordinator of the virtual reality manager, wherein the control data generator is configured to use a finger position error, a relative hand position error, and a head position error to generate the virtual image control data;

wherein finger position error is a difference between positions of fingers identified in the hand position data and positions of the fingers simulated in a current virtual image;

wherein relative hand position error is a difference between positions of hands identified in the hand position data and positions of virtual hands in the current virtual image; and wherein head position error is a difference between position of the head identified in the head position data and position of the head in the current virtual image.

13. The virtual reality system of claim 12, wherein the virtual reality manager is configured to send the virtual image control data to the virtual image application and receive the current virtual image of a virtual environment for the current time from the virtual image application.

14. The virtual reality system of claim 12 further comprising:
a display device associated with the head-mounted system, wherein the virtual reality manager is further configured to display the current virtual image of a virtual environment to the user on the display device.

15. The virtual reality system of claim 13, wherein the current virtual image includes a virtual left hand and a virtual right hand in which the virtual left hand is an image representing a left hand of the user and the virtual right hand is an image representing a right hand of the user.

16. The virtual reality system of claim 12, wherein the virtual reality manager comprises:

the data coordinator configured to synchronize the hand position data and the head position data with respect to time, wherein the data coordinator comprises:
- a hand data modulator configured to identify modified hand position data using left hand position data in the hand position data, right hand position data in the hand position data, and the image-based position data;
- a head data modulator configured to identify modified head position data using the head position data and the current frame of reference;
- the control data generator configured to generate the virtual image control data using the modified hand position data, the modified head position data, and a set of constraints; and
- a constraint identifier configured to identify the set of constraints using user data, wherein the user data is based on a set of user images.

17. The virtual reality system of claim 16, wherein the data coordinator further comprises:
- a feedback controller configured to identify the finger position error, the relative hand position error, and the head position error using the modified hand position data, the modified head position data, and the set of constraints.

18. The virtual reality system of claim 12, wherein the virtual reality system further comprises:
the hand system, wherein the hand system comprises:
- a left glove configured to generate left hand position data, wherein the left glove is configured to substantially conform to a left hand of the user; and
- a right glove configured to generate right hand position data, wherein the right glove is configured to substantially conform to a right hand of the user.

19. The virtual reality system of claim 12, wherein the virtual image control data is used to control a virtual image of a virtual environment in which the virtual environment is a simulation of an engineering environment selected from one of a design environment, a manufacturing environment, a computer environment, a testing environment, a data management environment, an inspection environment, and an operations environment.

20. A computer comprising:
a bus;
a non-transitory storage device connected to the bus, wherein the non-transitory storage device includes program code; and
a processor unit connected to the bus, wherein the processor unit is configured to execute the program code to:
- receive hand position data for at least one hand of a user from a hand system;
- receive head position data for a head of the user from a head-mounted system;
- identify image-based position data and a current frame of reference for a current time using a target image corresponding to the current time;
- generate virtual image control data for the current time using the hand position data, the head position data, the image-based position data, and the current frame of reference, wherein the virtual image control data is configured for use by a virtual image application; and
- generate the virtual image control data with a desired level of accuracy using a feedback controller, a finger position error, a relative hand position error, and a head position error;
wherein finger position error is a difference between positions of fingers identified in the hand position data and positions of the fingers simulated in a current virtual image;
wherein relative hand position error is a difference between positions of hands identified in the hand position data and positions of virtual hands in the current virtual image; and
wherein head position error is a difference between position of the head identified in the head position data and position of the head in the current virtual image.

21. The computer of claim 20, wherein the processor unit is further configured to execute the program code to display a current virtual image for the current time, received from the virtual image application, on a display device associated with the head-mounted system.

* * * * *